(12) United States Patent
Duan et al.

(10) Patent No.: US 8,618,793 B2
(45) Date of Patent: Dec. 31, 2013

(54) HIGH SENSITIVITY GLIDE SENSOR USING FRICTIONAL HEATING

(75) Inventors: Shanlin Duan, Fremont, CA (US); Jizhong He, San Jose, CA (US); John S. Hopkins, Gilroy, CA (US); Kenneth E. Johnson, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 413 days.

(21) Appl. No.: 12/646,831

(22) Filed: Dec. 23, 2009

(65) Prior Publication Data

US 2011/0149706 A1    Jun. 23, 2011

(51) Int. Cl.
*G01R 33/12* (2006.01)
*G11B 27/36* (2006.01)
*G11B 5/33* (2006.01)

(52) U.S. Cl.
USPC .............................. 324/210; 360/31; 360/324

(58) Field of Classification Search
USPC ............ 324/210–212, 235, 260–262; 29/593; 360/110, 31, 75, 240, 324–324.2, 326
See application file for complete search history.

(56) References Cited

U.S. PATENT DOCUMENTS

| | | | |
|---|---|---|---|
| 5,527,110 A | 6/1996 | Abraham et al. | 374/5 |
| 5,640,089 A | 6/1997 | Horikawa et al. | 324/212 |
| 5,825,181 A | 10/1998 | Schaenzer et al. | 324/212 |
| 5,872,311 A | 2/1999 | Schaenzer et al. | 73/105 |
| 6,069,769 A * | 5/2000 | Dorius et al. | 360/235.6 |
| 6,071,007 A | 6/2000 | Schaenzer et al. | 374/7 |
| 6,160,685 A * | 12/2000 | Hamilton | 360/246.2 |
| 6,216,242 B1 | 4/2001 | Schaenzer | 714/723 |
| 6,262,572 B1 | 7/2001 | Franco et al. | 324/212 |
| 6,360,428 B1 | 3/2002 | Sundaram et al. | 29/603.12 |
| 6,486,660 B1 * | 11/2002 | Luse et al. | 324/210 |
| 6,580,572 B1 * | 6/2003 | Yao et al. | 360/25 |
| 6,714,006 B2 * | 3/2004 | Mackay et al. | 324/210 |
| 6,777,929 B2 * | 8/2004 | Fang et al. | 324/210 |
| 6,899,456 B2 | 5/2005 | Sundaram et al. | 374/4 |
| 7,027,263 B2 | 4/2006 | Ottesen et al. | 360/234.4 |

(Continued)

FOREIGN PATENT DOCUMENTS

JP    10198956    7/1998    ............... G01B 7/00

OTHER PUBLICATIONS

Boyd et al., "MR Glide Inspection for Hard Disk Defect Detection" SPIE Conference on Surface Characterization for Computer Disks, Wafers, and Flat Panel Displays, San Jose CA, Jan. 1999.

*Primary Examiner* — Joshua Benitez-Rosario
(74) *Attorney, Agent, or Firm* — Zilka-Kotab, PC (57) ABSTRACT

A tool for testing a magnetic disk for use in a magnetic disk drive. The tool detects surface defects or asperities by detecting a change in electrical resistance corresponding to a temperature change in a thermally sensitive layer. The apparatus includes a slider body having a thermally insulating layer formed on an air bearing surface of the slider body and a thermal sensor layer formed on the thermally insulating layer. The thermally insulating layer prevents thermal heat spikes in the thermal sensor layer (such as resulting from contact with an asperity) from dissipating quickly into the slider body itself. The thermal sensor layer is a material that exhibits a change in electrical resistance in response to a change in temperature and is preferably a PTC thermistor material which exhibits a large change in electrical resistance when a transition temperature has been reached.

22 Claims, 8 Drawing Sheets

(56) References Cited

U.S. PATENT DOCUMENTS

| | | |
|---|---|---|
| 7,054,084 B2 | 5/2006 | Fong et al. ............... 360/31 |
| 7,057,385 B2 | 6/2006 | Yokohata et al. ............ 324/212 |
| 7,193,824 B2 * | 3/2007 | Naka ............... 360/324.2 |
| 7,265,922 B2 | 9/2007 | Biskeborn et al. ............ 360/55 |
| 7,317,597 B2 * | 1/2008 | Naka ............... 360/324.2 |
| 8,040,131 B2 * | 10/2011 | Call et al. ............... 324/210 |
| 8,085,038 B2 * | 12/2011 | Uesugi et al. ............ 324/210 |
| 2006/0092570 A1 * | 5/2006 | Payne et al. ............ 360/236.5 |
| 2013/0070366 A1 * | 3/2013 | Kodama et al. ............ 360/75 |
| 2013/0077189 A1 * | 3/2013 | Kato et al. ............ 360/75 |
| 2013/0170068 A1 * | 7/2013 | Natori ............... 360/75 |

* cited by examiner

HIGH SENSITIVITY GLIDE SENSOR USING FRICTIONAL HEATING

FIELD OF THE INVENTION

The present invention relates to perpendicular magnetic recording and more particularly to a magnetic device for detecting defects in a magnetic media of a magnetic disk drive.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, both of which are magnetically connected with one another at a location removed from the air bearing surface, such as by a magnetic back gap layer and a magnetic shaping layer. A non-magnetic, electrically conductive write coil generates a magnetic flux in the write pole and return pole. The write pole has a cross section at the air bearing surface that is much smaller than the cross section of the return pole. The magnetic flux in the return pole and write pole causes a magnetic write field to be emitted to the magnetic medium, thereby recording a magnetic signal thereon. The magnetic flux then flows through the media to return to the return pole wherein it is sufficiently spread out that it does not erase the previously recorded bit.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The magnetic read and write heads are very sensitive to any sort of head disk contact. A contact between the head and the disk causes a sever heat spike that can permanently damage the read and write heads. In addition, the contact can cause physical damage to the read or write head or to the disk itself. One way that such a contact can occur is if the disk has a physical asperity. The disk is designed and manufactured to be as close to perfectly smooth and flat as possible. However, in some instances physical asperities can exist, and must be detected on the disk before a finished disk drive product can be assembled and shipped.

One process that has been used to detect such asperities is by the use of optical glide testing. However since there is no mechanical contact involved, such a process cannot really measure the damage potential of a defect such as the hardness of the defect. In addition, this process is limited to a very small spot size of a laser used to perform such a test. As a result throughput using such a process is very low.

SUMMARY OF THE INVENTION

The present invention provides a device for testing a magnetic disk. The device includes a slider body having an air bearing surface, a thermally insulating layer is formed on the air bearing surface of the slider, and a thermal sensor layer is formed on the thermally insulating layer such that the thermally insulating layer is between the slider body and the thermal sensor layer.

The slider can be incorporated into a testing device that can include a housing with a spindle mounted within the housing for holding a magnetic disk. An actuator can be provided for moving the slider over a surface of the magnetic disk. The testing device can also include circuitry connected with the thermal sensor layer for detecting a change in electrical resistance of the thermal sensor layer, the change in resistance corresponding to a change in temperature resulting from contact with an asperity on the disk. The thermal sensor layer can be constructed of a material such as PTC thermistor that has an abrupt resistance change when a certain transition temperature has been reached.

The testing device provides several advantages to accurately detecting very small asperities. First, the sensor is located on the air bearing surface rather than on the trailing edge or some other surface of the slider. This allows a greater portion of the thermal sensor layer to make contact with the asperity resulting in increased effectiveness of the sensor layer.

Secondly, the thermal sensor layer is separated from the slider body by a layer of thermally insulating material. This prevents heat in the thermal sensor layer from dissipating quickly into the slider body.

In addition, as discussed above the thermal sensor layer can be constricted of a material such as PTC thermistor material that has a very abrupt change in resistance when a certain temperature has been reached. This greatly increases the thermal signal generated by the thermal sensor and increases the sensitivity of the device.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
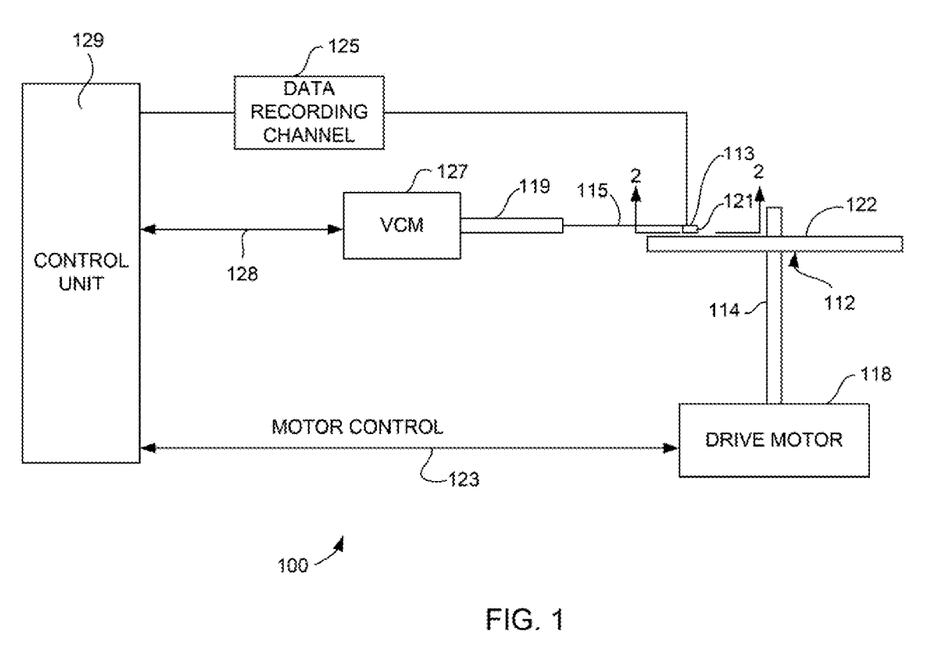
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
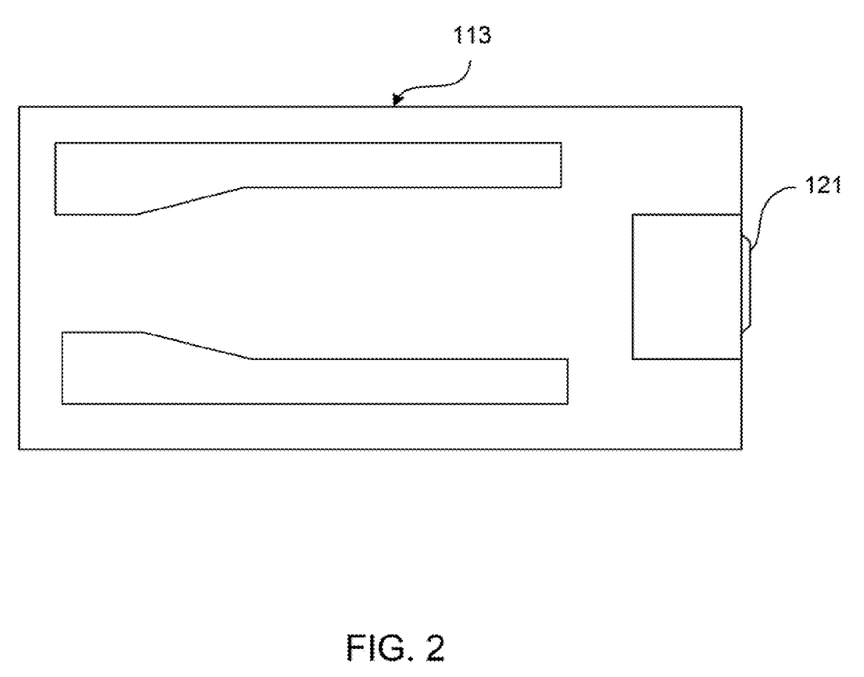
FIG. 2 is an ABS view of a slider, taken from line 2-2 of FIG. 1, illustrating the location of a magnetic head thereon.

With reference to FIG. 2, the orientation of the magnetic head 12.1 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
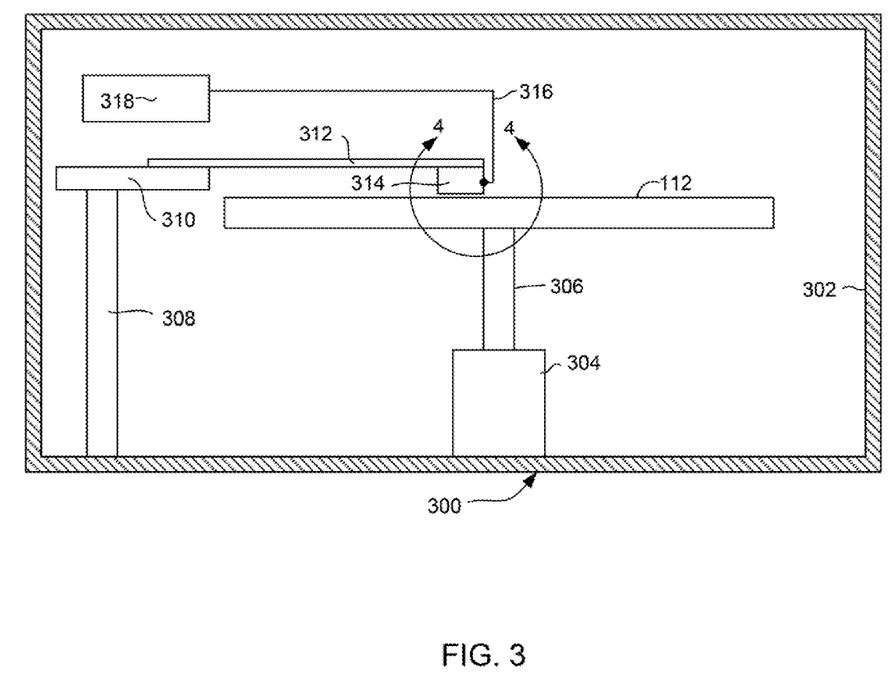
FIG. 3 is a schematic illustrating a tool for testing a magnetic disk for asperities.

FIG. 3 shows a testing tool 300 for detecting and measuring physical defects or asperities on a magnetic disk 112. The tool includes a housing 302 on or in which is mounted a motor 304 which is connected with a spindle 306. The magnetic disk 112 is mounted on the spindle so as to spin the disk 112 in a manner similar to that by which it would spin in an actual disk drive device. An actuator support structure 308 is also mounted within the housing 302 and holds an actuator arm 310. The actuator arm 310 is connected with a suspension 312 at the end of which is held a slider 314 that is specially configured to detect defects or asperities on the disk 112, as will become apparent below. Electrical leads 316 connect the slider 314 with processing circuitry 318 that is operable to process a signal from the slider 314 to detect and measure the presence of defects and asperities on the disk 112.

Figure 4:
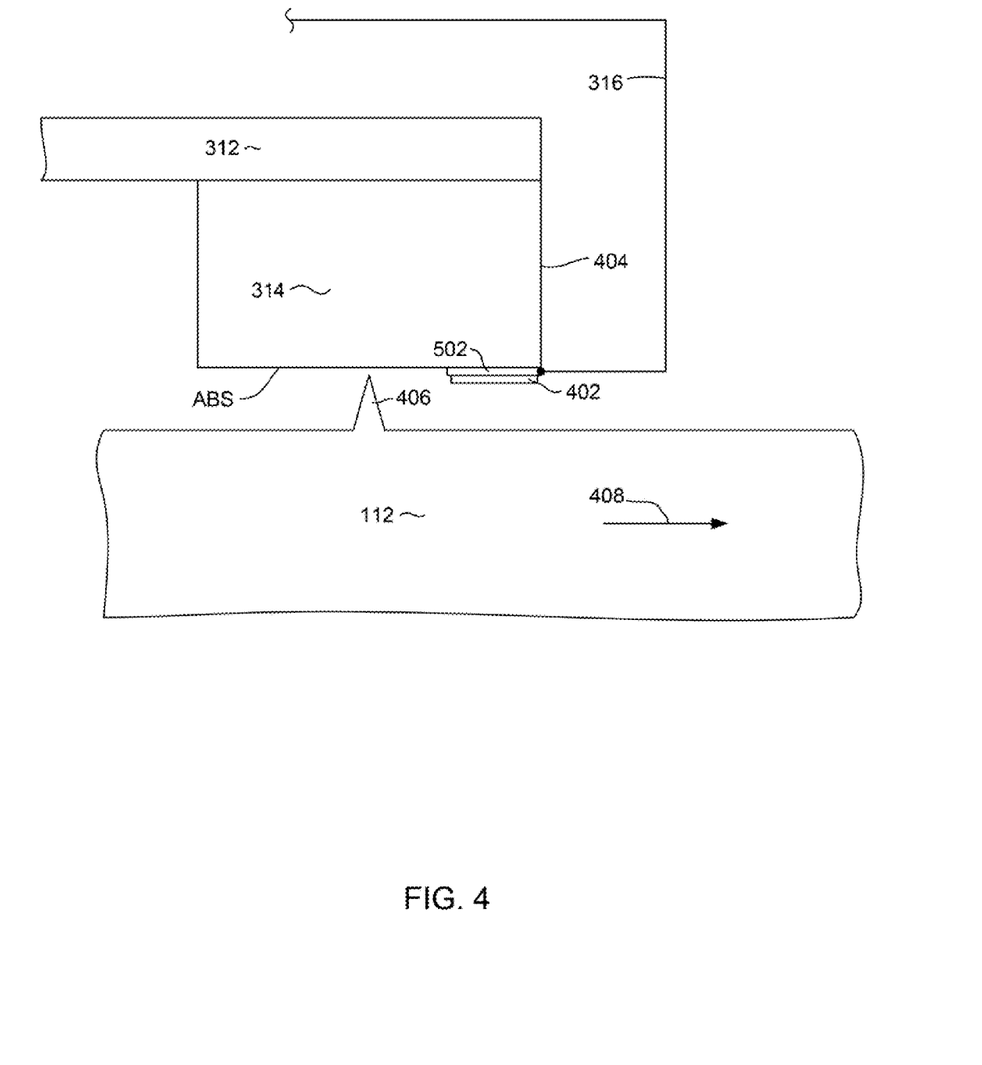
FIG. 4 is an enlarged view taken from circle 4-4 of FIG. 3, showing a test slider and disk.

FIG. 4 shows an enlarged view of the slider 314, viewing the circle designated 4-4 in FIG. 3. As shown in FIG. 4, the air bearing surface (ABS) of the slider 314 faces the magnetic medium 112. A thermal sensor 402 is connected with air bearing surface (ABS), and is preferably located near the trailing edge 404 of the slider 314. The electrical leads 316, previously discussed, connect the thermal sensor 402 with processing circuitry 318 (FIG. 3).

With continued reference to FIG. 4, the slider 314 and thermal sensor 402 are effective in detecting the presence of an asperity or defect such as an asperity 406. When the asperity comes into contact with the thermal sensor 402, or even with a portion of the slider 314 that is near the thermal sensor 402, the resulting friction causes a significant rise in temperature in the thermal sensor 402. This temperature rise results in an increased resistance of the sensor 402, which can be detected by the processing circuitry 318 (FIG. 1).

Figure 5:
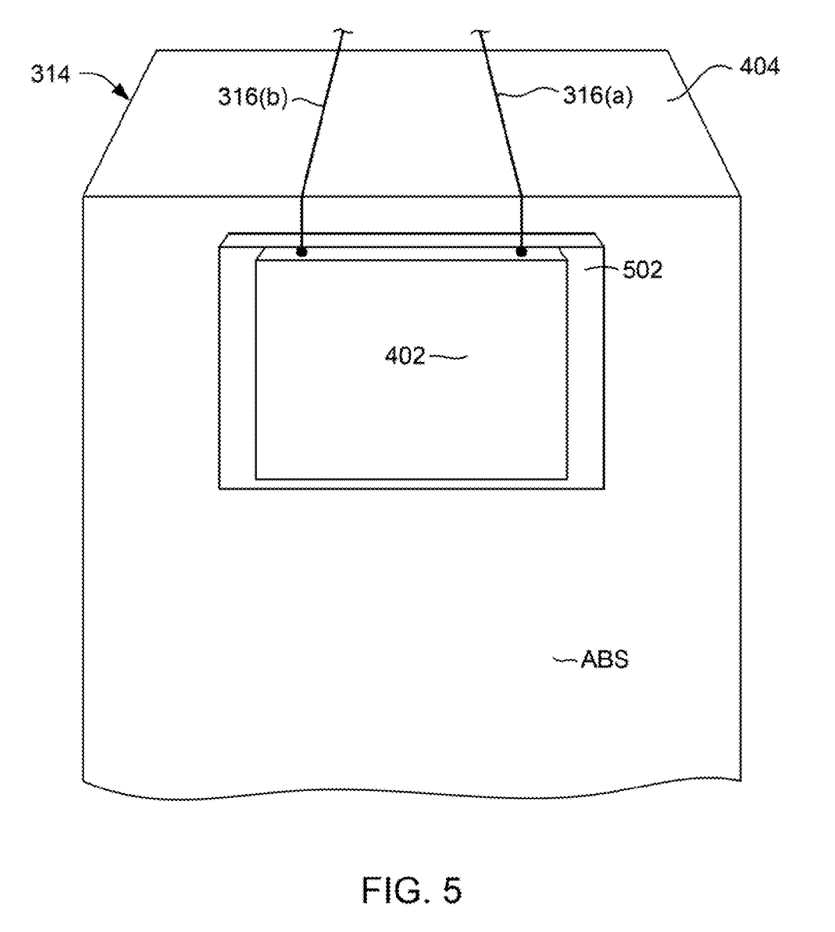
FIG. 5 is an ABS view of a test slider.

FIG. 5 shows an enlarged ABS view of a portion of the slider 314, with a portion of the trailing edge 404 shown as well. As can be seen in FIG. 5, the thermal sensor 402 is separated from the body of the slider 314 by a layer of thermally insulating material (thermal insulator) 502. This thermal insulation layer 502 is important to the efficient operation of the thermal sensor 402. Sliders such as the slider 314 are constructed of materials that have high thermal conductivity and high heat capacity. They therefore act as strong heat sinks. Materials used for such sliders 314 typically include materials such as AlTiC. Without the insulation layer 502, any temperature rise in the sensor 402 (resulting from contact with a disk asperity) would be much weaker and shorter lived. Therefore, the effectiveness of the sensor 402 would be greatly diminished. To this end, the thermal insulation layer 502 (which is disposed between the thermal sensor 502 and the slider body 314) can be constructed of various thermally insulating materials and is preferably constructed of amorphous silicon dioxide $SiO_2$ or silicon-oxide.

Figure 8:
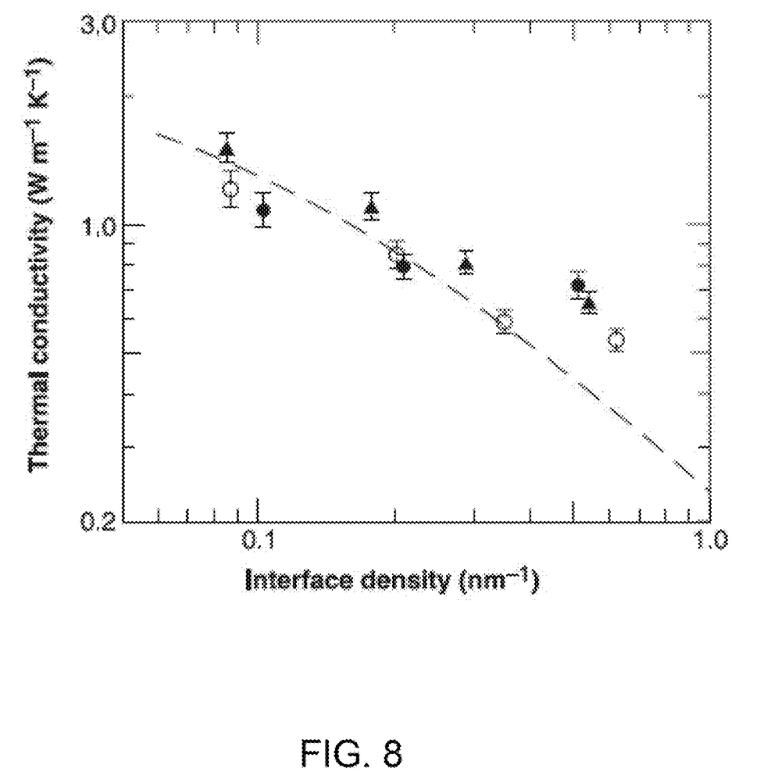
FIG. 8 is a graph illustrating the thermal conductivity of a $W/Al_2O_3$ metal/insulator nano-laminate.

More preferably, the insulator layer 502 can be constructed of a metal/insulator nanolaminate, such as a $W/Al_2O_3$ nanolaminate. Metal/insulator nanolaminates have been found to have a thermal conductivity that is about 5 times lower than amorphous $SiO_2$. This allows the sensor 402 to be about 5 times more sensitive. FIG. 8 shows a graph that illustrates the excellent insulating properties of a metal oxide nano-laminate such as $W/Al_2O_3$. FIG. 8 shows the relationship between interface density and thermal conductivity of such a thermally insulating layer, and as can be seen, the thermal conductivity is advantageously very low. In addition, materials such as $W/Al_2O_3$ can be formed using materials and deposition methods already used in construction magnetic heads, so the use of such materials would add little additional cost.

The thermal sensor 402 is constructed of a novel material that provides an excellent thermal signal response. To this end, the thermal sensor 402 can be constructed of a PTC Thermistor material. Such a material consists of a ceramic composition that is doped in such a manner as to have a sharp transition in the temperature coefficient of resistance at a specific switching temperature, which is usually around the Curie temperature of the material. The composition of the material and the doping level determines the temperature at which switching occurs. These devices can be doped to have switching temperatures in the overall range of 0 degrees C. to 200 degrees C. However, many such materials have switching temperatures in the range of +60 degrees C. to +120 degrees C. The thermal coefficient is extremely high, on the order of a few degrees of temperature change. In addition, such materials exhibit good corrosion resistance.

In one embodiment of the invention the sensor 402 layer 10 um wide and 5 um long and very thin, such as 1 um or less in thickness. The sensor 402 can be constructed of barium titanate, and can be doped with various trace elements (such as cerium) to reach semiconductivity. For example, the resistivity of barium titanate containing 0.1 molecular percent cerium abruptly changes resistance between 120 degrees C. and 150 degrees C. The insulator 502 can be 50 um or more in thickness and can be constructed of amorphous $SiO_2$ or a metal/insulator laminate such as $W/Al_2O_3$ as mentioned above.

Figure 7:
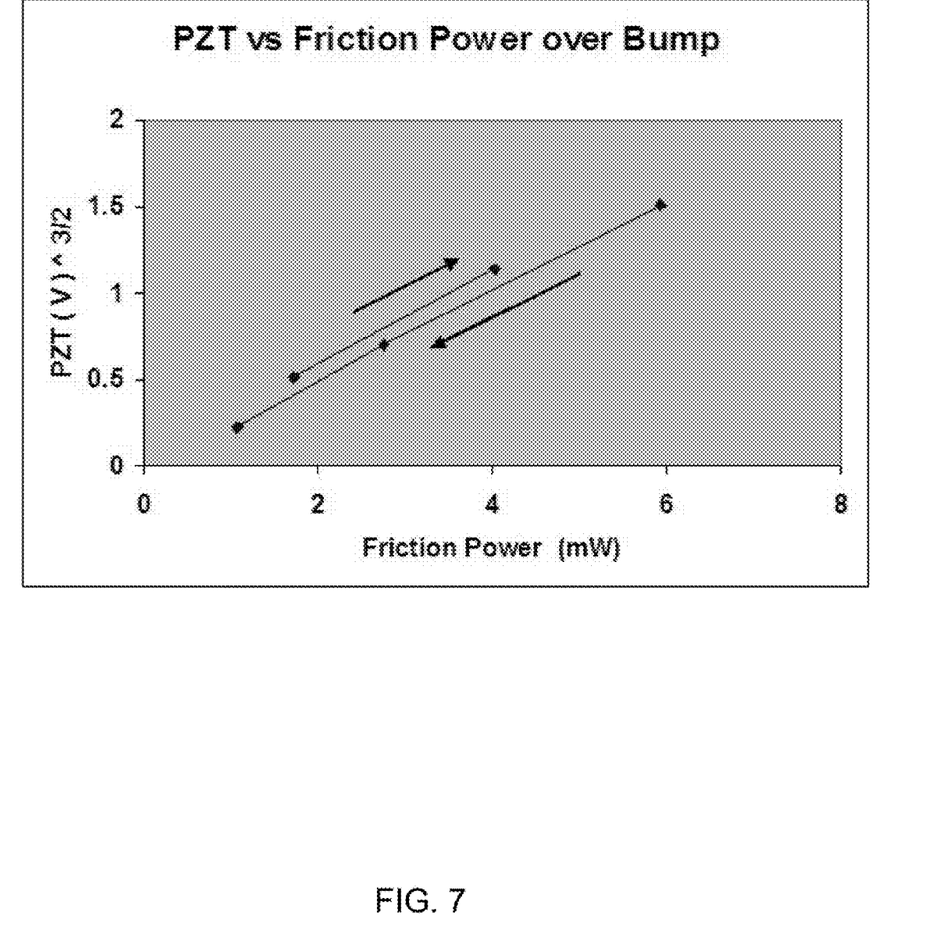
FIG. 7 is a graph illustrating a relationship between PZT response and friction power for a sensor according to a possible embodiment of the invention.

The graph of FIG. 7 illustrates the PZT response relative to power generated by friction for a sensor according to a possible embodiment of the invention. The thermal resistance is calculated from the formula L/A/kappa and found to be 1K/uW. Assuming the PTC material could resolve 0.1K, the minimum friction power detectable is about 0.1 uW. This corresponds to about 0.9 mV of PZT based on the correlation data shown in the graph of FIG. 7. Currently the noise level of the PZT sensor is about 50 mV and that means the sensor will be about 50 times more sensitive than prior art sensor structures.

Figure 6:
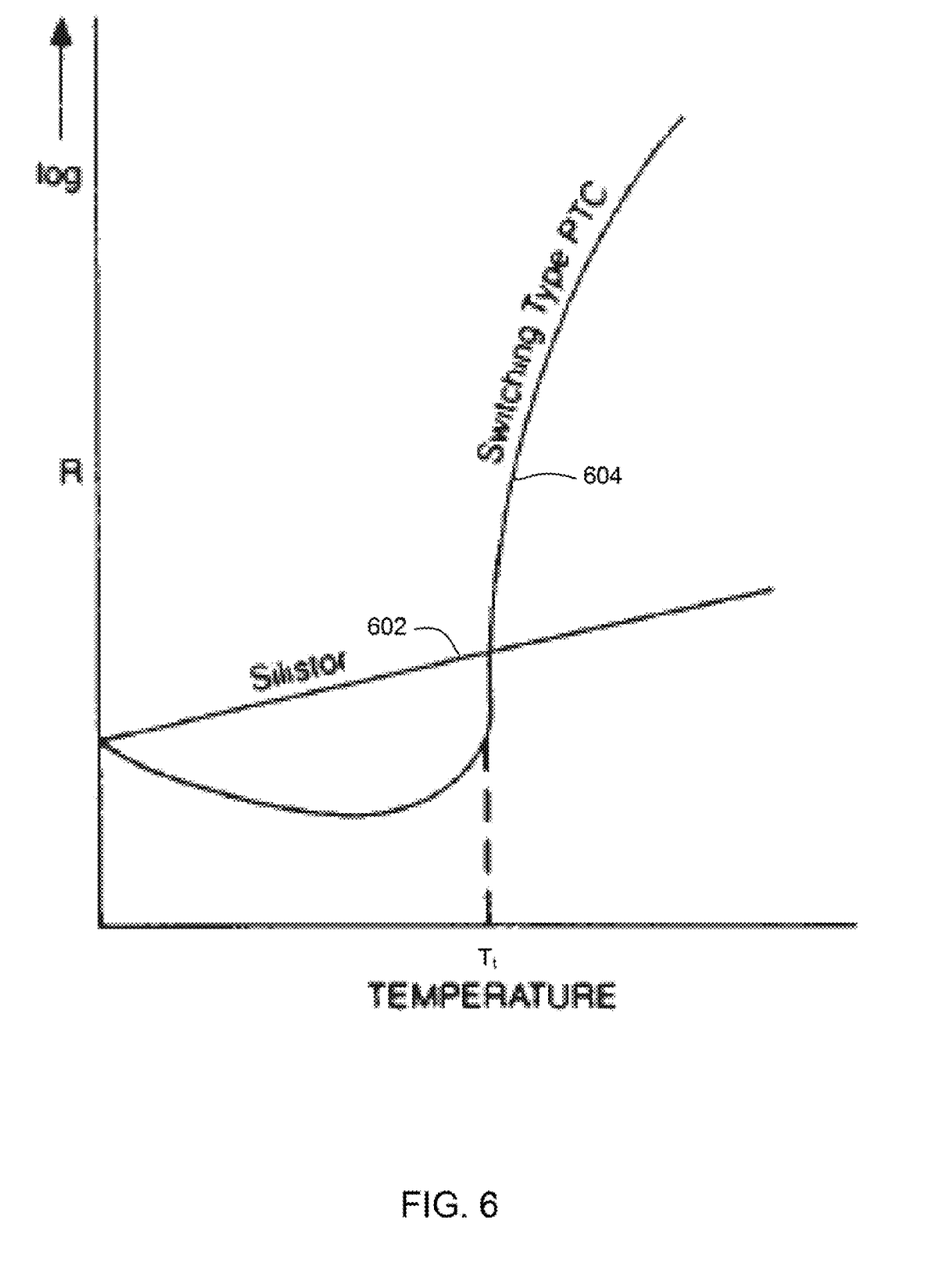
FIG. 6 is a graph illustrating a relationship between electrical resistance and temperature for a thermal sensor material for use in a testing device.

FIG. 6 is a graph that illustrates the change in resistance (as a log scale) relative to a change in temperature. The line 602 shows the linear response that would be provided by a material such as NiFe or many other materials. The line 604, however illustrates the resistance response for a PTC thermistor material. As can be seen, when the material reaches a transition temperature T, the resistance increases dramatically. As mentioned above, the actual temperature at which this transition temperature T, occurs can be controlled by choice of the base material and amount and type of doping material used.

The thermal sensor 402 preferably has a width that is wider than a typical GMR or TMR magnetoresistive sensor used in a disk drive. Making the sensor wider increases throughput of testing by allowing the sensor 402 to test a larger area of the disk with each pass. However, the sensor should not be too wide, such that any localized temperature rise (from contact with an asperity) is dissipated into the rest of the sensor and does not result in a significant temperature increase. To this end, the sensor 402 preferably has a surface area of 50 um, and preferably has a width of 10 um and a length of 5 um. The sensor 402 can have a thickness of 1 um or less.

In operation, a magnetic disk 112 is placed into a testing tool 300 (FIG. 3). The disk 112 is caused to spin within the tool 300, which causes the disk 112 move beneath the slider 314 as indicated by arrow 408 in FIG. 4. As shown in FIG. 4, an asperity 406 formed on the disk 112 will contact the sensor 402 causing the temperature to increase. This temperature increase causes the resistance of the sensor 402 to increase dramatically, and this resistance increase is detected and processed by the circuitry 318 via leads 316(a), 316(b) (FIG. 5).

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. An apparatus for testing a magnetic disk, comprising:
   a housing;
   a spindle mounted within the housing for holding a magnetic disk;
   a slider held within the housing for movement adjacent to a surface of the disk, the slider having an air bearing surface; and
   a thermally insulating layer formed on the air bearing surface of the slider; and
   a thermal sensor layer formed on the thermally insulating layer, such that the thermally insulating layer is between the slider and the thermal sensor layer.

2. The apparatus for testing a magnetic disk as in claim 1 further comprising circuitry connected with the thermal sensor layer for detecting an electrical resistance change in the thermal sensor layer.

3. The apparatus for testing a magnetic disk as in claim 1 wherein the thermal sensor layer comprises a material that has an electrical resistance that changes in response to a change in temperature.

4. The apparatus for testing a magnetic disk as in claim 1 wherein the thermal sensor layer comprises a PTC thermistor.

5. The apparatus for testing a magnetic disk as in claim 1 wherein the thermal sensor layer comprises doped barium titanate.

6. The apparatus for testing a magnetic disk as in claim 1 wherein the thermally insulating layer comprises amorphous a metal/insulator nanolaminate.

7. The apparatus for testing a magnetic disk as in claim 1 wherein the thermal sensor layer has a width of 10 um.

8. The apparatus for testing a magnetic disk as in claim 1 wherein the thermal sensor layer has a surface thickness of less than 1 um.

9. The apparatus for testing a magnetic disk as in claim 1 wherein the thermal sensor layer comprises barium titanate doped with cerium.

10. The apparatus for testing a magnetic disk as in claim 1 wherein the thermal sensor layer comprises barium titanate doped with 0.1 molecular percent cerium.

11. An apparatus for testing a magnetic disk, comprising:
a slider body having an air bearing surface;
a thermally insulating layer formed on the air bearing surface of the slider; and
a thermal sensor layer formed on the thermally insulating layer such that the thermally insulating layer is between the slider body and the thermal sensor layer.

12. The apparatus for testing a magnetic disk as in claim 1 wherein the thermally insulating layer comprises a $W/Al_2O_3$ nanolaminate.

13. The apparatus for testing a magnetic disk as in claim 11 wherein the thermally insulating layer comprises amorphous a metal/insulator nanolaminate.

14. The apparatus for testing a magnetic disk as in claim 11 wherein the thermal sensor layer comprises a material that has an electrical resistance that changes in response to a change in temperature.

15. The apparatus for testing a magnetic disk as in claim 11 wherein the thermal sensor layer comprises a PTC thermistor.

16. The apparatus for testing a magnetic disk as in claim 11 wherein the thermal sensor layer comprises doped barium titanate.

17. The apparatus for testing a magnetic disk as in claim 11 wherein the thermal sensor layer has a width of 10 um.

18. The apparatus for testing a magnetic disk as in claim 11 wherein the thermal sensor layer has a thickness of less than 0.1 um.

19. The apparatus for testing a magnetic disk as in claim 11 further comprising circuitry connected with the thermal sensor layer for detecting a change in electrical resistance of the thermal sensor layer.

20. The apparatus for testing a magnetic disk as in claim 11 further comprising, first and second electrical leads connected with the thermal sensor layer and also connected with circuitry for detecting a change in electrical resistance of the thermal sensor layer.

21. The apparatus for testing a magnetic disk as in claim 11 wherein the thermal sensor layer and the thermally insulating layer are formed on the air bearing surface at a trailing end of the slider body.

22. The apparatus for testing a magnetic disk as in claim 11 wherein the thermally insulating layer comprises a $W/Al_2O_3$ nanolaminate.

* * * * *